United States Patent
Irie et al.

(10) Patent No.: US 8,386,257 B2
(45) Date of Patent: Feb. 26, 2013

(54) EMOTION DETECTING METHOD, EMOTION DETECTING APPARATUS, EMOTION DETECTING PROGRAM THAT IMPLEMENTS THE SAME METHOD, AND STORAGE MEDIUM THAT STORES THE SAME PROGRAM

(75) Inventors: Go Irie, Kanagawa (JP); Kota Hidaka, Kanagawa (JP); Takashi Satou, Kanagawa (JP); Yukinobu Taniguchi, Kanagawa (JP); Shinya Nakajima, Kanagawa (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 937 days.

(21) Appl. No.: 12/439,051

(22) PCT Filed: Sep. 13, 2007

(86) PCT No.: PCT/JP2007/067849
§ 371 (c)(1),
(2), (4) Date: Jun. 4, 2009

(87) PCT Pub. No.: WO2008/032787
PCT Pub. Date: Mar. 20, 2008

(65) Prior Publication Data
US 2009/0265170 A1 Oct. 22, 2009

(30) Foreign Application Priority Data
Sep. 13, 2006 (JP) ................. 2006-248090

(51) Int. Cl.
*G10L 21/00* (2006.01)
*G10L 15/28* (2006.01)
*G10L 15/18* (2006.01)
(52) U.S. Cl. .............. 704/270; 704/255; 704/257

(58) Field of Classification Search ................. None
See application file for complete search history.

(56) References Cited

U.S. PATENT DOCUMENTS 4,959,865 A * 9/1990 Stettiner et al. .............. 704/233
5,987,415 A * 11/1999 Breese et al. ................ 704/270
(Continued)

FOREIGN PATENT DOCUMENTS

EP 1 531 458 A1 5/2005
JP 11 119791 4/1999
(Continued)

OTHER PUBLICATIONS

Dimitrios Ververidis, Constantine Kotropoulos, "Emotional speech recognition: Resources, features, and methods", Speech Communication, vol. 48, Issue 9, Sep. 2006, pp. 1162-1181.*

(Continued)

*Primary Examiner* — Brian Albertalli
(74) *Attorney, Agent, or Firm* — Oblon, Spivak, McClelland, Maier & Neustadt, L.L.P.

(57) ABSTRACT

An audio feature is extracted from audio signal data for each analysis frame and stored in a storage part. Then, the audio feature is read from the storage part, and an emotional state probability of the audio feature corresponding to an emotional state is calculated using one or more statistical models constructed based on previously input learning audio signal data. Then, based on the calculated emotional state probability, the emotional state of a section including the analysis frame is determined.

21 Claims, 6 Drawing Sheets

U.S. PATENT DOCUMENTS

| | | | |
|---|---|---|---|
| 6,151,571 A * | 11/2000 | Pertrushin | 704/209 |
| 6,671,668 B2 * | 12/2003 | Harris | 704/246 |
| 7,283,962 B2 * | 10/2007 | Meyerhoff et al. | 704/270 |
| 7,788,104 B2 * | 8/2010 | Matsuo et al. | 704/276 |
| 7,983,910 B2 * | 7/2011 | Subramanian et al. | 704/250 |
| 2003/0055654 A1 | 3/2003 | Oudeyer | |
| 2003/0182123 A1 | 9/2003 | Mitsuyoshi | |
| 2007/0192097 A1 * | 8/2007 | Ma et al. | 704/239 |

FOREIGN PATENT DOCUMENTS

| | | |
|---|---|---|
| JP | 11 265239 | 9/1999 |
| JP | 2002 91482 | 3/2002 |
| JP | 2003 508805 | 3/2003 |
| JP | 2003 99084 | 4/2003 |
| JP | 2005 345496 | 12/2005 |
| JP | 2005 352420 | 12/2005 |
| JP | 3803311 | 8/2006 |

OTHER PUBLICATIONS

Nogueiras, A., Marino, J. B., Moreno, A., Bonafonte, A., "Speech emotion recognition using hidden Markov models", In: Proc. European Conf. Speech Communication and Technology (Eurospeech '01), 2001.*

Nwe, T. L., Foo, S. W., De Silva, L. C., "Speech emotion recognition using hidden Markov models," Speech Communication 41, 603-623, 2003.*

Womack, B. D., Hansen, J. H. L., "N-channel hidden Markov models for combined stressed speech classification and Recognition", IEEE Trans. Speech and Audio Processing 7 (6), 668-667, 1999.*

Polzin, T. S., Weibel, A. H., "Detecting emotions in speech", In: Proc. Cooperative Multimodal Communication (CMC '98), 1998.*

Office Action issued Dec. 09, 2010, in China Patent Application No. 200780031814.X (with English translation.

Qing Wang, "Research of the Chinese audio enotion identification if the Chinese based on the network of nerves", Chapter 5 (Analyses of Emotional and Acoustic Features of Chinese Voices ), and Chapter 8 (Voice Emotion Identification Based on Neural Networks), Zhejiang University Master's Thesis, Sep. 15, 2004, 15 pages (with partial English translation).

Björn Schuller, et al., "Hidden Markov Model-Based Speech Emotion Recognition", ICASSP 2003, vol. 2, Apr. 2003, pp. II-1-4.

Office Action issued on Aug. 24, 2010, in Korean Patent Application No. 10-2009-7004066 (with Full English Translation).

Valery A. Petrushin, "Emotion in Speech: Recognition and Application to call Centers", Intelligent Engineering Systems Through Artificial Neural Networks 1999 ASME, vol. 9, XP-002560353, 1999, pp. 1085-1092.

Furui, S. "Digital Speech Processing, Chapter 4, 4.9 Pitch Extraction", Tokai University Press, pp. 57-59, p. 58 and I, (1985), (with partial English translation).

Sagayama, S. et al., "On Individuality in a Dynamic Measure of Speech", Proc. of the 1979 Spring Meeting of the Acoustic Society of Japan, 3-2-7, pp. 589-590, and 589-589-1, (1979), (with partial English translation).

Ishii, K. et al., "Pattern Recognition", OHMSHA, First Edition, pp. 52-54, 52-53 and 204, (1998), (with partial English translation).

Wang, J. et al., "Calculation of Statistics I: New technique of the probability calculation, frontier of statistics science 11, Chapter 3,3 EM Method, 4 Variational Bayesian Method", Iwanami Shoten, pp. 157-186, 1-7 and 196, (2003), (with partial English translation).

Kitagawa, G. et al., "Non-Gaussian State-Space Modeling of Nonstationary Time Series", Journal of the American Statistical Association, vol. 82, No. 400, pp. 1032-1063, (1987).

Irie, G. et al., "An Affective Scene Detection Technique for Consumer Generated Videos", Proceedings of the 2007 IEICE General Conference, ISSN 1349-1369, D-12-94, IEICE, p. 210, 5 and 8, (2007), ( with partial English translation).

Irie, G. et al., "A "Laughter", Scene Extraction Technique for Video Content Skimming", Proceedings of the $3^{rd}$ Digital Contents Symposium, 3-3, Tokyo, 6 pages and 1/1, (2007) , (with English abstract and partial English translation).

Office Action issued Sep. 13, 2011, in Japanese Patent Application No. 2008-534386.

* cited by examiner

EMOTION DETECTING METHOD, EMOTION DETECTING APPARATUS, EMOTION DETECTING PROGRAM THAT IMPLEMENTS THE SAME METHOD, AND STORAGE MEDIUM THAT STORES THE SAME PROGRAM

TECHNICAL FIELD

The present invention relates to an emotion detecting art based on audio signal data.

BACKGROUND ART

With the recent increase of multimedia contents, there is an increasing market demand for a content summarizing art that allows users to view contents in a shorter time. In addition, the variety of contents is also increasing, such as movie, drama, home video, news, documentary and music, and thus the variety of user requests is also increasing.

With the increase of variety of user requests, there is an increasing demand for an art for retrieving and presenting any desired image or scene in response to a user request. As an example of such arts, there is known a content summarizing art that summarizes an audiovisual content based on audio signal data in the content (see the Patent literatures 1 and 2, for example).

According to the content summarizing art disclosed in the Patent literature 1 described above, audio data is analyzed to extract at least one of the fundamental frequency, the power and the temporal variation characteristics of the dynamic feature quantity and/or the differences thereof between frames as audio feature vectors. Using a codebook that associates representative vectors obtained by quantization of the extracted audio feature vectors, emotions of speakers, and the respective emotion appearance probabilities with each other, the probabilities of appearance of emotional states including laughter, anger and sorrow are determined.

According to the disclosed emotion detecting method, a part of the content that includes a section determined to be in an emotional state based on the emotional state appearance probabilities is determined as an important part and extracted.

Similarly, according to the content summarizing art disclosed in the Patent literature 2 described above, audio data is analyzed to extract at least one of the fundamental frequency, the power and the temporal variation characteristics of the dynamic feature quantity and/or the differences thereof between frames as audio feature vectors. Using a codebook that associates representative vectors obtained by quantization of the extracted audio feature vectors, the speech emphasis state probability and the calm state probability with each other, the probabilities of appearance of the emphasis state and the calm state are determined.

According to the emotion detecting methods described above, a plurality of pieces of learning audio signal data are retained, and the emotional state is determined by comparison between newly input audio signal data and the retained learning audio signal data. Therefore, in order to increase the determination accuracy, the amount of learning audio signal data has to be increased. Thus, the emotion detecting methods described above are known to have a problem that the memory cost and the calculation cost are enormous.

As related arts, there are known a method of extracting a fundamental frequency and a power (see the Non-patent literature 1, for example), a method of extracting a temporal variation characteristic of a speech rate (see the Non-patent literature 2, for example), a method of estimating a parameter of a probability model (see the Non-patent literatures 3 and 4, for example), and a method of determining a generalized state space model (see the Non-patent literature 5, for example).

Patent literature 1: Japanese Patent Application Laid Open No. 2005-345496 (paragraphs 0011 to 0014, for example)

Patent literature 2: Japanese Patent No. 3803311

Non-patent literature 1: Sadaoki Furui, "Digital Speech Processing, Chapter 4, 4.9 Pitch Extraction," Tokai University Press, September 1985, pp. 57-59

Non-patent literature 2: Shigeki Sagayama, Fumitada Itakura "On individuality in a Dynamic Measure of Speech," Proc. of The 1979 Spring Meeting of The Acoustic Society of Japan, 3-2-7, 1979, pp. 589-590

Non-patent literature 3: Kenichiro Ishii, Naonori Ueda, Eisaku Maeda, Hiroshi Murase "Pattern Recognition," Ohmsha, first edition, August 1998, pp. 52-54

Non-patent literature 4: Jinfang Wang, Syu Tezuka, Naonori Ueda, Masaaki Taguri "Calculation of Statistics I: New technique of the probability calculation, frontier of statistics science 11, Chapter 3, 3 EM Method, 4 Variational Bayesian Method," Iwanami Shoten, June 2003, pp. 157-186

Non-patent literature 5: Kitagawa, G., "Non-Gaussian state-space modeling of nonstationary time series," Journal of the American Statistical Association, December 1987, pp. 1032-1063

DISCLOSURE OF THE INVENTION

Problem to be Solved by the Invention

The emotion detecting methods described above do not consider occurrence of high-pitched voice, scream, quivering voice or the like, which are frequently found in an emotional speech, and thus can determine only a limited kinds of, or typical, emotional states, such as laughter, anger and sorrow.

In addition, the emphasis state or the emotional state is determined based only on the information obtained from the audio feature. Therefore, when the sound to be dealt with contains a large amount of noise, the information obtained from the audio feature cannot provide a sufficient ground for the determination. As a result, detection error often occurs. For example, a sound that should be determined to be in the emotional state of anger is erroneously determined to be in the emotional state of sorrow if the audio feature affected by the noise accidentally resembles the emotional state of sorrow.

Similarly, there is a problem that, if a section of one or more frames that should be determined to be in the emotional state of laughter contains a frame having an extremely high probability of the emotional state of sorrow, the section is determined to be in the emotional state of sorrow.

Furthermore, there is a problem that, since the audio feature vector is quantized for each frame so that the audio feature vector, which is a continuous quantity, is represented by several representative vectors, an important change in the audio feature vectors that characteristically occurs in a speech in the emotional state cannot be detected, and the accuracy of emotional state determination is reduced.

The present invention has been made to solve the problems described above, and an object thereof is to provide an emotion detecting method that can achieve emotional state determination with high accuracy even when a sound containing a large amount of noise is dealt with by detecting an important change in an audio feature vector that characteristically occurs in a speech in the emotional state and moreover taking into account not only the change of the audio feature vector but also a characteristic of the emotional state itself and can be applied in a wider variety of fields, such an emotion detecting apparatus, an emotion detecting program that implement the method, and a recording medium in which the program is recorded.

The "characteristic of an emotional state itself" means a characteristic relating to the behavior of the emotional state. That is, an emotional state easily changes to some emotional states but hardly changes to other emotional states. For example, an emotional state of delight is unlikely to quickly change to an emotional state of sorrow.

Therefore, for example, in determination of the emotional state of a section, even if the audio feature of the section resembles the audio feature in the case of the emotional state of sorrow, if the emotional states of the sections preceding and following the section are estimated, and the estimation result suggests that the emotional states thereof are probably delight, it is possible to avoid easily determining that the emotional state of the section is sorrow.

The present invention provides an emotion detecting method that determines the emotional state by taking into account the behavior of the emotional state itself and therefore can achieve the determination with high accuracy even in the case where the audio feature alone is not sufficient for accurate determination, such an emotion detecting apparatus, an emotion detecting program that implements the method, and a recording medium in which the program is recorded.

Means to Solve the Problems

According to a first aspect of the present invention, an emotion detecting method or apparatus that performs an emotion detecting processing based on an audio feature of input audio signal data:

extracts one or more of a fundamental frequency, a sequence of a temporal variation characteristic of the fundamental frequency, a power, a sequence of a temporal variation characteristic of the power and a temporal variation characteristic of a speech rate from the audio signal data for each analysis frame as an audio feature vector and stores the audio feature vector in a storage part;

reads the audio feature vector for each analysis frame and calculates the audio feature appearance probability that the audio feature vector appears on condition of sequences of one or more emotional states using a first statistical model constructed based on previously input learning audio signal data;

calculates the probability of temporal transition of sequences of one or more emotional states as the emotional state transition probability using a second statistical model;

calculates the emotional state probability based on the audio feature appearance probability and the emotional state transition probability; and outputs information about the emotional state for each section including one or more analysis frames based on the calculated emotional state probability.

According to a second aspect of the present invention, an emotion detecting method or apparatus that performs an emotion detecting processing based on an audio feature of input audio signal data:

extracts one or more of a fundamental frequency, a sequence of a temporal variation characteristic of the fundamental frequency, a power, a sequence of a temporal variation characteristic of the power and a temporal variation characteristic of a speech rate from the audio signal data for each analysis frame as an audio feature vector and stores the audio feature vector in a storage part;

reads the audio feature vector for each analysis frame and calculates the emotional state probability on condition of the audio feature vector for sequences of one or more emotional states using one or more statistical models constructed based on previously input learning audio signal data;

determines the emotional state of a section including the analysis frame based on the emotional state probability; and outputs information about the determined emotional state.

Furthermore, there are provided a computer program that implements the emotion detecting method according to the first or second aspect of the present invention and a recording medium in which the program is recorded. Furthermore, the present invention includes a computer-executable program that implements the emotion detecting method according to the first or second aspect of the present invention and a recording medium in which the program is recorded.

Effects of the Invention

As described above, according to the method or apparatus according to the first aspect of the present invention, not only a statistical model concerning an audio feature but also a statistical model concerning the transition probability of an emotional state sequence are used, and the emotional state probability is calculated based on the two statistical models that deal with different kinds of information, so that information about the emotional state and a natural transition thereof can be more accurately grasped. Furthermore, since the information about the emotional state is obtained by taking into account a temporal emotional transition characteristic, which is a fundamental characteristic of an emotional state, even when much noise is superposed on the audio feature, the information about the emotional state can be obtained with higher accuracy than the prior art in which the audio feature appearance probability of each frame is calculated based only on the audio feature and therefore deviates from the true value thereof.

According to the method or apparatus according to the second aspect of the present invention, a variation of the audio feature that frequently occurs in a speech in an emotional state is detected based on a statistical model concerning the audio feature, the emotional state can be determined by taking into account a characteristic voice condition in the emotional speech, so that a wider variety of emotional states can be determined with higher accuracy.

In the method or apparatus according to the first or second aspect of the present invention, if emotional states are selected in descending order of the calculated emotional state probability, more detailed information about a plurality of mixed emotional states and the variations thereof can be obtained.

In the method or apparatus according to the first or second aspect of the present invention, if the emotional state is determined based on the difference between the probability of each of the emotional states and a convex combination of the probabilities of the other emotional states, the emotional state can be determined by taking into account an evoking relationship between different emotional states.

In the method or apparatus according to the first or second aspect of the present invention, if the input audio signal data is divided into audio sub-paragraphs each including successive speech sections, and a content summary is extracted based on the emotional level of each audio sub-paragraph, it is possible to more flexibly satisfy the summary requirements from the viewer/listener.

In the method or apparatus according to the first or second aspect of the present invention, if the input audio signal data is divided into sections each including one or more successive analysis frames based on the periodicity thereof, and a content summary is extracted based on the emotional level of each audio sub-paragraph, it is possible to more flexibly satisfy the summary requirements from the viewer/listener.

The present invention can make a contribution to the field of the emotion detecting art because of the advantages described above.

BRIEF DESCRIPTION OF THE DRAWINGS

FIG. 6 is a graph showing an example of an emotional state probability in a case where emotional states of delight, sorrow and calm are dealt with;

BEST MODES FOR CARRYING OUT THE INVENTION

Figure 1:
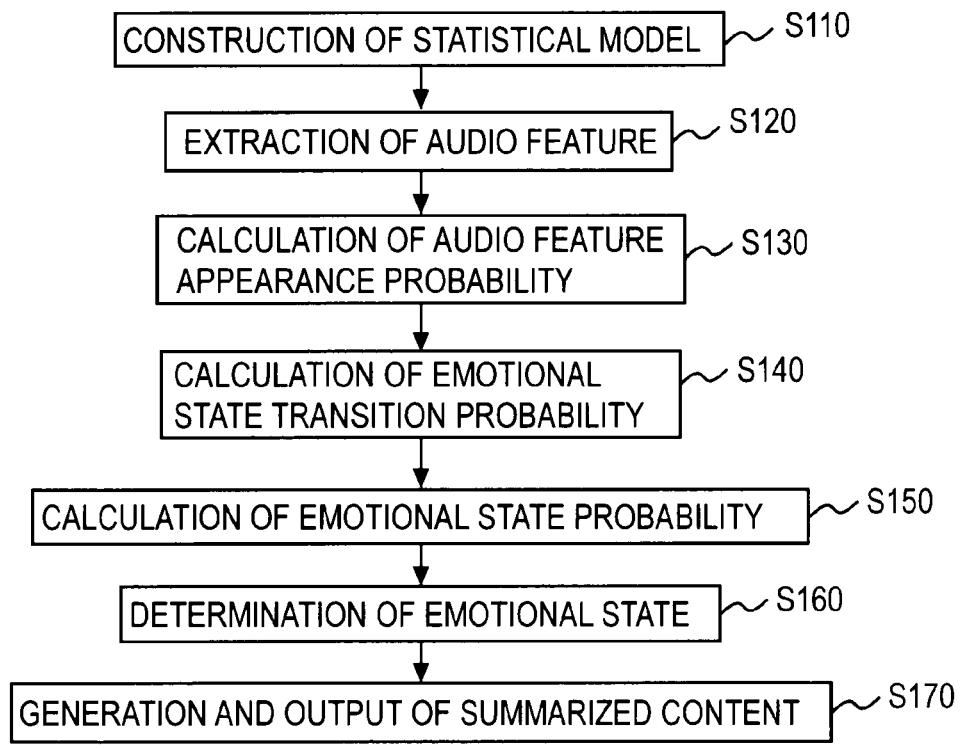
FIG. 1 is a flowchart for illustrating an emotion detecting method according to an embodiment of the present invention.

An emotion detecting method according to an embodiment of the present invention will be described with reference to FIG. 1. FIG. 1 is a flowchart for illustrating the emotion detecting method according to this embodiment. In this embodiment, it is supposed that data is accessibly stored in a general-purpose storage part (a memory or a hard disk drive, for example) or storage means.

First, step S110 (a statistical model constructing step) is a step that is performed before actual determination of an emotional state in the emotion detecting method according to this embodiment, in which two statistical models used for calculating the emotional state probability (referred to as first statistical model and second statistical model) are constructed. Entities of the statistical models include parameters, such as functions and statistical quantities used for the statistical calculations, described in the form of programs. Codes indicating the parameters and the function types of the statistical models are stored in a storage part, and the storage capacity therefor is smaller than that for all actual data.

Then, in step S120 (audio feature extracting step), a desired audio feature is calculated and extracted in the form of a vector from audio signal data of a captured content in units of one or more analysis frames (in the following, referred to simply as frame). More specifically, for example, each analysis frame is composed of a plurality of sub-frames, the input audio signal data is analyzed for each sub-frame to calculate the fundamental frequency and the power, which are audio features, and an audio feature vector is formed for each analysis frame based on the audio features for the sub-frames included in a predetermined number, which is equal to or larger than one, of analysis frames including the analysis frame. The audio feature vector is composed of one or more of elements including the fundamental frequency, a sequence of a temporal variation characteristic of the fundamental frequency, the power, a sequence of a temporal variation characteristic of the power, and a temporal variation characteristic of the speech rate. The audio signal data is input using audio signal data inputting means (an input part 210 shown in FIG. 12 described later, for example). The extracted audio feature is stored in a storage part. Steps S120 to S150 constitute a process of calculating the emotional state probability.

Then, in step S130 (audio feature appearance probability calculating step), based on the audio feature vectors calculated and stored in the storage part in step S120, the probability of appearance of an audio feature vector corresponding to an emotional state is calculated for each frame using the first statistical model previously constructed in step S110, and the result of the calculation is regarded as the audio feature appearance probability.

Then, in step S140 (emotional state transition probability calculating step), using the second statistical model previously constructed in step S110, the probability of temporal transition of one or more state variables corresponding to the emotional state is calculated for each frame, and the result of the calculation is regarded as the emotional state transition probability.

Then, in step S150 (emotional state probability calculating step), the emotional state probability is calculated for each frame based on the audio feature appearance probability calculated in step S130 and the emotional state transition probability calculated in step S140, and the calculated emotional state probability is stored in the storage part in association with any one of the frame identification number and time information.

Then, in step S160 (emotional state determining step), for each frame, the emotional state of the frame is determined based on the emotional state probability calculated in step S150 and output together with the associated frame identification number. In this step, for example, the emotional state that provides the maximum emotional state probability for each frame may be determined, a predetermined number of emotional states may be determined in descending order of emotional state probability from the emotional state that provides the maximum emotional state probability, or the sequence of all the emotional states arranged in descending order of emotional state probability may be determined. The determination may be performed for each section composed of one or more frames, such as an audio sub-paragraph and an audio paragraph described later.

The result of the determination is output as information about the emotional state of the audio signal data. For example, when the input audio signal data is an audiovisual content, if not only the content but also the determination result associated with the frame identification number or time information is provided to a viewer/listener, the viewer/listener can retrieve a frame or a section that involves a desired emotional state from the content based on the determination result.

If necessary, in step S170 (summarized content generating and outputting step), a summary of the content is generated in units of a section composed of one or more frames over which the emotional state determined in step S160 continues, and the summary of the content is output. The emotional state probability calculated in step S150 is information indicating the emotional state for each frame of the input audio signal data, and therefore, the determination in step S160 described above may be omitted, and the emotional state probability associated with the frame identification number or time information may be output. For example, the emotional state probability associated with the frame identification number may be provided to the viewer/listener together with the content, and the viewer/listener may set a desired criterion of the emotional state probability to extract the summary from the content.

In the following, each step of the emotion detecting method will be described in more detail.

Figure 2:
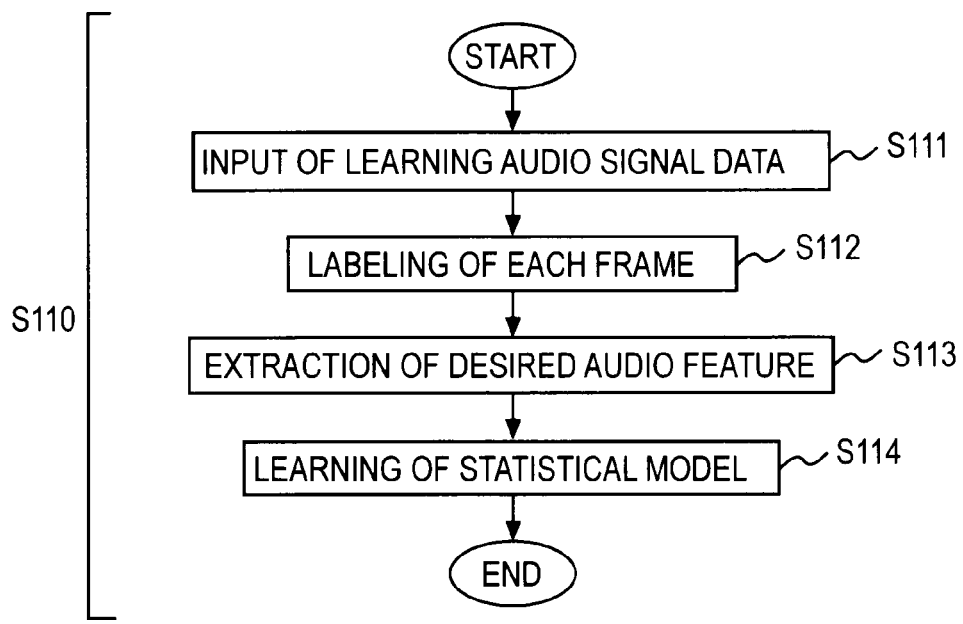
FIG. 2 is a flowchart for specifically illustrating processings performed in a step of constructing statistical models according to the embodiment.

First, a procedure of constructing two statistical models in step S110 will be described in detail with reference to FIG. 2. The statistical models are acquired by learning from learning audio signal data.

First, in sub-step S111, learning audio signal data is input. The learning audio signal data may be input using the inputting means for the content audio signal data or using inputting means dedicated for the learning audio signal data (a recording medium that stores the learning audio signal data).

Then, in sub-step S112, for each of the frames of the entire learning audio signal data, the value of the emotional state e of the frame, which is determined by a person based on actual viewing or listening of the learning audio signal data, is set. The information that indicates the value of the emotional state e determined by the person for each frame is referred to as label, and the operation of inputting the determined value of the emotional state in association with the frame is referred to as labeling. The label may be a numerical value or a code that can identify the type of the emotion to be noted.

Even if the label indicating the emotional state e is not given to each frame in a strict sense, any information that can be converted into a label for each frame can be used after conversion. In an example, a label indicating an emotional state e is provided to a section of a plurality of successive frames. In such a case, each frame in the section can be labeled by providing the same label as that provided to the section to each frame. More specifically, in a case where an audio section from a time t1 to a time t2 is labeled as an emotional state e, all the frames in the section are labeled as e.

Then, in sub-step S113, an audio feature vector x is extracted from each frame as in step S120 described above. As described later, the audio feature vector x for each frame may be determined based not only on the audio feature for the frame but also on the audio feature for a predetermined number of preceding frames. In the following, an audio feature vector and an emotional state for a frame $F_t$ denoted by a frame identification number t are denoted by $x_t$ and $e_t$, respectively.

Then, in sub-step S114, the first statistical model used for calculation of the audio feature appearance probability and the second statistical model used for calculation of the emotional state transition probability are constructed by learning.

First, an example of a learning method for the first statistical model used for calculation of the audio feature appearance probability will be described.

The first statistical model used for calculation of the audio feature appearance probability is created as a probability distribution in a vector space of the audio feature vector x for each frame. For example, for a frame $F_t$, the first statistical model is created as a conditional probability distribution $p^A(x_t|E_t)$ that represents the probability of appearance of $x_t$ depending on an emotional state sequence $E_t = \{e_t, e_{t-1}, \ldots, e_{t-n+1}\}$ in a frame section including the frame and a predetermined number n of successive preceding frames. Reference symbol n represents an integer equal to or greater than 1 and can be 2 or 3, for example.

The conditional probability distribution $p^A(x_t|E_t)$ may be created for each possible value of $E_t$ using a probability model, such as a normal distribution, a mixed normal distribution and a hidden Markov model (HMM) of the appearance probability of $x_t$. Furthermore, the conditional probability distribution may be created using a different probability model, such as a normal distribution, a multinomial distribution and a mixture thereof, depending on the type of the audio feature. A parameter of the probability model is estimated from the learning audio signal data by a conventional learning method, thereby completing the first statistical model.

For the parameter estimation, for example, conventionally well-known methods (see the Non-patent literatures 3 or 4, for example), such as the maximum likelihood estimation, the EM algorithm and the variational Bayesian method, can be used.

Next, the second statistical model used for calculation of the emotional state transition probability will be described.

As with the first statistical model used for calculation of the audio feature appearance probability, the second statistical model used for calculation of the emotional state transition probability is acquired by learning from learning audio signal data.

In the following, an example of a process of learning in step S114 will be described on the assumption that, in steps S111 to S113 described above, an audio feature vector x is extracted for each frame of the entire learning audio signal data, and a label indicating the emotional state e of the frame is determined for each frame of the entire learning audio signal data based on actual listening by a person. The emotional state for a frame denoted by a frame identification number t is denoted by $e_t$.

The second statistical model used for calculation of the emotional state transition probability is a probability distribution in a space of an emotional state sequence $E_t$ from the (t−n+1)-th frame to the t-th frame and is created as a conditional probability distribution $p^B(E_t|E_{t-1})$ that represents the probability of appearance of $E_t\{e_t, e_{t-1}, \ldots, e_{t-n+1}\}$ depending on the emotional state sequence $E_{t-1} = \{e_{t-1}, e_{t-2}, \ldots, e_{t-n}\}$ for (n−1) frames preceding the frame $F_t$.

The variable $e_t$ represents emotions including "delight", "sorrow", "fear", "intense", "cool", "pretty", "exciting", "passionate", "romantic", "violent", "gentle", "soothing", "warm", "cold" and "weird" and expressions of emotional states including "laugh", "crying", "scream" and "whispering" and is a discrete variable. Therefore, the conditional probability distribution $p^B(E_t|E_{t-1})$ described above can be constructed by creating a bigram probability distribution, for example. In this case, the conditional probability distribution $p^B(E_t|E_{t-1})$ can be constructed by counting the number of appearances of each emotional state sequence $E_t$ when the sequence $E_{t-1}$ is provided based on the learning audio signal data. This is nothing other than the most likelihood estimation. Alternatively, however, learning can be performed by the Bayesian method by defining an appropriate prior distribution.

The processing performed in step S110 has been described above.

Then, in step S120, a desired audio feature vector for each frame is extracted from the audio signal data of the captured content. The term "audio" used in the present invention includes not only to the conversational speech of a person but also singing voice and music.

In the following, an example of an audio feature vector extracting process will be described.

First, the audio feature will be described. It is preferred that the audio feature in this embodiment can be stably acquired in a noisy environment compared with a high-order acoustic spectral peak or the like and is unlikely to depend on the profile of the speaker in determination of the emotional state. As audio features that meet the conditions described above, one or more of a fundamental frequency f0, a sequence $\{rf0^i\}$ of a temporal variation characteristic of the fundamental frequency, a power p, a sequence $\{rp^i\}$ of a temporal variation characteristic of the power, a temporal variation characteristic of the speech rate and the like are extracted. Reference symbol i represents a temporal variation characteristics index.

In addition, in this embodiment, the term "sequence" is defined as a set of one or more elements. As required, the temporal variation characteristic may be selected from among the regression coefficient, the average value, the maximum value and the minimum value of in-frame variations, the cumulative sum of the absolute values of in-frame variations, and the range. In particular, in the case of the regression coefficient, the index can be associated with the order. Regression coefficients of any orders can be used, and regression coefficients of first to third orders can be used, for example. In the example described below, a case where only the regression coefficient is used as the temporal variation characteristic will be described. However, other temporal variation characteristics may be used in combination. The power p may be expressed in terms of the amplitude value of the audio signal waveform or in terms of the absolute value, the smoothed value or the rms value thereof. Alternatively, for example, the average value of the power in a frequency band, such as a region from 500 Hz to 4 KHz, which is highly audible to human ears, may be used. Furthermore, the value obtained by performing one or more of a linear transformation, a nonlinear transformation and an integral transformation (Fourier transformation or cosine transformation, for example) that involve an appropriate coordinate transformation (a principal component analysis, for example) on the extracted various audio features may be used as another audio feature.

There are a wide variety of method of extracting the fundamental frequency f0 and the power p to be extracted. Those extracting methods are well known. Thus, for more detailed information about the methods, see the Non-patent literature 1 described above, for example.

As the temporal variation characteristic of the speech rate to be extracted, a temporal variation characteristic rm of a dynamic measure m is extracted by a well-known method (see the Non-patent literature 2 or the Patent literature 1). For example, peaks of the dynamic measure may be detected and counted to determine the speech rate. Alternatively, the average value or the variance of peak intervals, which correspond to the speech rhythm, may be calculated to determine the temporal variation characteristic of the speech rate.

In the following description, the average value of peak intervals of the dynamic measure is used as the temporal variation characteristic rm of the dynamic measure. Provided that the sequence of the temporal variation characteristic of the fundamental frequency to be extracted is represented by $\{rf0^i\}$ and the sequence of the temporal variation characteristic of the power is represented by $\{rp^i\}$, an exemplary method of extracting a regression coefficient will be described.

Provided that the frame to be analyzed is a frame at a time t, the fundamental frequency $f0_t$ and the power $p_t$ extracted at the time t are related to the sequences $\{rf0^i_t\}$ and $\{rp^i_t\}$ according to the following approximate expressions, respectively.

$$f0_t \approx \sum_{i=0}^{i=I} rf0^i_t \times t^i \quad (1)$$

$$p_t \approx \sum_{i=0}^{i=I} rp^i_t \times t^i \quad (2)$$

In these formulas, reference symbol I represents the maximum order of the regression function. For example, when I=1, the approximate expressions are linear approximations, and when I=2, the approximate expressions are second-order curve approximations. The sequences $\{rf0^i_t\}$ and $\{rp^i_t\}$ can be determined so that the approximation error in the vicinity of t is small. To achieve this, for example, the method of least squares can be used.

The maximum order I can assume any value. However, here, a case where the temporal variation characteristic $rf0^1_t$ of the fundamental frequency in the case where I=1 is determined will be described as an example. Provided that the frame to be analyzed is a frame at a time t, the temporal variation characteristic $rf0^1_t$ of the fundamental frequency at the time t can be determined by the following formulas.

$$rf0^{I=1}_t = \frac{\sum_{j=t-d}^{j=t+d}(f0_j - rf0^{I=0}_t)j}{\sum_{j=t-d}^{j=t+d} j^2} \quad (3)$$

$$rf0^{I=0}_t = \frac{1}{2d-1}\sum_{j=t-d}^{j=t+d} f0_j \quad (4)$$

Figure 3:
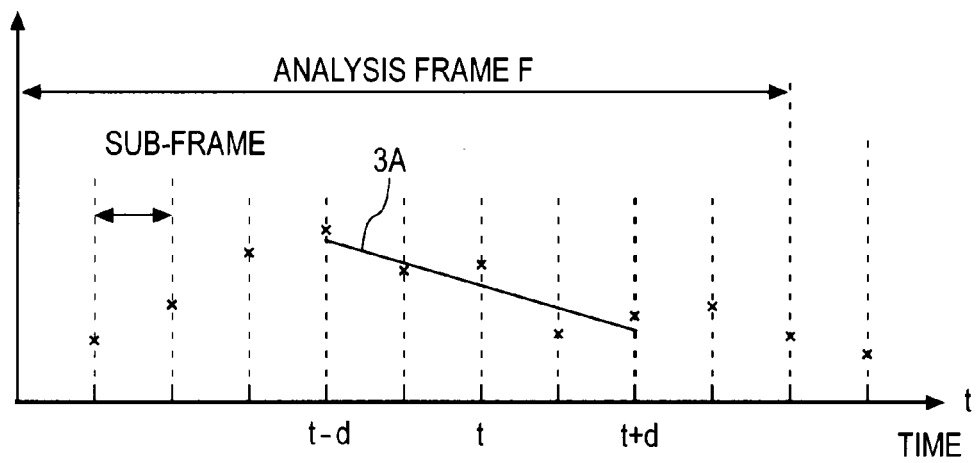
FIG. 3 is a conceptual diagram for illustrating a method of determining a temporal variation characteristic of a fundamental frequency.

FIG. 3 shows a sequence of the fundamental frequency f0 determined for each frame from the audio signal data. The formula (4) of the temporal variation characteristic $rf0^{I=0}_t$ in the case where I=0 represents the average of the fundamental frequency f0 in a section from (t−d) to (t+d), and the formula (3) of the temporal variation characteristic $rf0^{I=1}_t$ in the case where I=1 represents the gradient of an approximate line 3A determined from the fundamental frequency f0 in the section from (t−d) to (t+d) schematically shown in FIG. 3 by the method of least squares. Here, reference symbol d represents the number of sub-frames around the time t that are used for calculation of the temporal variation characteristic, which corresponds to the vicinity of the time t. For example, d=2. In determination of the regression coefficient of a frame, a sub-frame that does not necessarily fall within the frame may be used for the calculation. The temporal variation characteristic $rp^i_t$ of the power can be calculated in the same way.

In the following, as an example, a case where only $rf0^1_t$ and $rp^1_t$ determined for I=1 are used as the temporal variation characteristic rf0 of the fundamental frequency and the temporal variation characteristic rp of the power will be described.

An exemplary method of calculating an audio feature for each analysis frame will be described. It is supposed that an analysis frame has a length (referred to as frame length hereinafter) of 100 msec, and the next frame is shifted by 50 msec from the current frame. In practice, the fundamental frequency and the power, which are the audio features, are extracted from the audio signal data for each of the subframes at intervals, such as 10 msec, significantly shorter than the analysis frame length as shown in FIG. 3, and the average values of the audio characteristic quantities over the subframes in each analysis frame, that is, an average fundamental frequency f0', an average temporal variation characteristic rf0' of the fundamental frequency, an average power p', an average temporal variation characteristic rp' of the power and an average peak interval average value rm' of the dynamic measure, are calculated. Alternatively, in addition to these average values, the maximum value, the minimum value, the fluctuation range or the like of each audio feature in the frame may be calculated and used. In the following, a case where only the average values are used will be described.

Each audio feature is preferably previously normalized. For example, the normalization may be achieved by subtracting the average fundamental frequency over the entire audio signal data to be processed from the average fundamental frequency f0' for each frame or dividing the average fundamental frequency f0' for each frame by the average fundamental frequency over the entire audio signal data to be processed or by the standard normalization under the condition that the average equals to 0 and the variance equals to 1. The other audio features can be normalized in the same way. If necessary, a smoothing processing is previously performed.

In determination of an emotional state, capturing a temporal variation of an audio feature is necessary. In this embodiment, capture of a temporal variation of an audio feature is achieved by forming an audio feature vector for each frame from the audio features in a predetermined number, which is equal to or larger than one, of frames including the frame. The section in which the audio feature vector is extracted is referred to as audio feature vector extracting section (the section denoted by W in FIG. 4, for example).

In the following, an exemplary method of capturing a temporal variation of an audio feature will be described with reference to FIG. 4.

It is supposed that the current frame F is represented by $F_j$, where reference symbol j denotes the frame identification number thereof. It is further supposed that the audio features included in the frame $F_j$ are an average fundamental frequency $f0'_j$, an average temporal variation characteristic $rf0'_j$ of the fundamental frequency, an average power $p'_j$, an average temporal variation characteristic $rp'_j$ of the power, and an average peak interval average value $rm'_j$ of the dynamic measure.

According to a possible method of forming an audio feature vector based on the audio features determined as described above, for example, an audio feature vector is formed by embedding the audio features for each frame in the audio feature vector extracting section in a delay coordinate space. That is, the audio features between the current frame $F_t$ and the preceding S frames $F_{t-S}$ is expressed as a vector.

Figure 4:
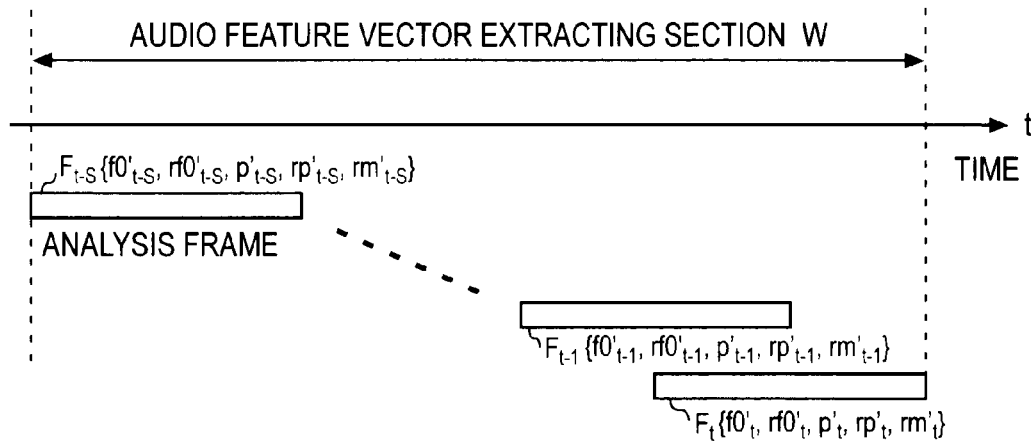
FIG. 4 is a diagram for illustrating a temporal variation of an audio feature vector.

For example, in the case of the average fundamental frequency, in the example shown in FIG. 4, an audio feature vector $f0^v$ for the average fundamental frequency, which is expressed according to $f0^v = \{f0'_t, f0'_{t-1}, f0'_{t-S}\}^T$ by average fundamental frequencies $f0'_t, f0'_{t-1}, \ldots,$ and $f0'_{t-S}$ extracted from the audio features for frames $F_t, F_{t-1}, \ldots,$ and $F_{t-S}$, is determined.

According to an alternative method, an audio feature vector may be formed by calculating the inter-frame difference of each audio feature between the current frame $F_t$ and each of the preceding S frames $F_{t-S}$ and expressing the inter-frame differences as vectors. For example, the inter-frame differences are the differences of the audio feature between the current frame $F_t$ and the preceding S frames $F_{t-1}$ to $F_{t-S}$.

If S=5, for example, the length of the audio feature vector extracting section W is 350 msec when the analysis frame length described above is 100 msec, and the adjacent frames are shifted by 50 msec from each other. In the same way, an audio feature vector $r0^v$ for the average temporal variation characteristic of the fundamental frequency, an audio feature vector $p^v$ for the average power, an audio feature vector $rp^v$ for the average temporal variation characteristic of the power, and an audio feature vector $rm^v$ for the average temporal variation characteristic of the dynamic measure are formed.

It is supposed that a set of all the audio feature vectors previously determined to be used for determination of the emotional state is represented by x. For example, when all the extracted audio features are used, $x = \{f0^{vT}, rf0^{vT}, p^{vT}, rp^{vT}, rm^{vT}\}^T$. Alternatively, when the temporal variation characteristic rf0 of the fundamental frequency, the temporal variation characteristic rp of the power, and the peak interval average value rm of the dynamic measure are used, $x = \{rf0^{vT}, rp^{vT}, rm^{vT}\}^T$. For example, the vector $f0^v$ is defined as a column vector in the above description, and therefore, the vector $f0^{vT}$, which represents the transposition thereof, is defined as a row vector.

According to this embodiment, the emotional state can be determined if one or more of the audio features are used. However, as for the speech that characteristically occurs in the emotional state, the fundamental frequency f0 is difficult to extract by itself in many cases and thus is often absent. Thus, the temporal variation characteristic rf0 of the fundamental frequency, which can effectively compensate for the absence, is preferably included among the audio features. Furthermore, to improve the determination accuracy while maintaining the low speaker dependency, the temporal variation characteristic rp of the power is preferably included among the audio features.

As described above, calculation of the audio features and the audio feature vectors for each frame is performed for the entire content, so that the audio feature vectors can be determined for all the frames.

The processing performed in step S120 has been described in detail.

Then, in step S130, using the audio feature vector for each frame extracted in step S120 and the first statistical model previously constructed in step S110, the probability of appearance of the audio feature vector (audio feature appearance probability) in each emotional state is calculated.

In the following, an exemplary processing performed in step S130 will be described.

An exemplary method of calculating the probability of appearance of the audio feature vector based on the first statistical model created in step S110 will be described.

The first statistical model is a conditional probability distribution $p^A(x_t|E_t)$ in the space of the audio feature vector $x_t$ determined for each frame. Thus, based on the first statistical model $p^A(x_t|E_t)$ previously created in step S110, the likelihood of the input audio feature vector $x_t$ for each possible value of $E_t$ is calculated for each frame. The calculated likelihood is regarded as the audio feature appearance probability of the audio feature vector $x_t$ in each emotional state sequence $E_t$.

The processing described above is performed for all the frames of the content (input audio signal data), so that the audio feature appearance probability can be calculated for all the frames.

The processing performed in step S130 has been described in detail.

Then, in step S140, using the second statistical model and depending on the emotional state of a frame that precedes the frame that is the target of emotional state determination (the current frame) by one or more frames, the probability of transition to each emotional state in the current frame (that is, the emotional state transition probability) is calculated.

In the following, an exemplary processing for implementing step S140 will be described.

First, an exemplary method of calculating the emotional state transition probability based on the second statistical model created in step S110 will be described.

Since the second statistical model is a conditional probability distribution $p^B(E_t|E_{t-1})$ in the space of the emotional state $E_t$, all the values of $p^B(E_t|E_{t-1})$ are calculated for all the possible values of $E_{t-1}$. The calculated values are used as the emotional state transition probability.

The processing described above is performed for all the frames, so that the emotional state transition probability can be calculated for all the frames.

The processing performed in step S140 has been described in detail.

Then, in step S150, based on the audio feature appearance probability and the emotional state transition probability calculated in steps S130 and S140, the emotional state probability is calculated.

In the following, an exemplary processing of calculating the emotional state probability performed in step S150 will be described.

Figure 5:
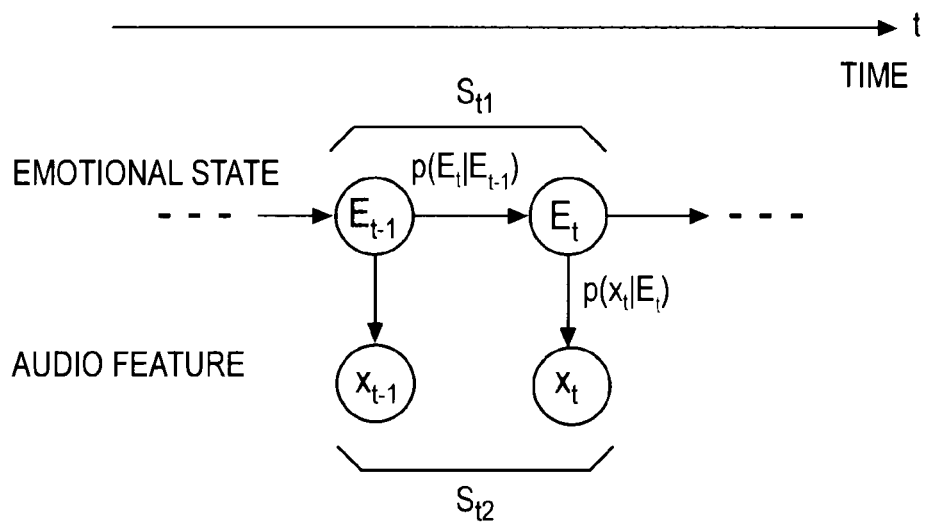
FIG. 5 is a conceptual diagram showing a generalized state space model.

The set of the two statistical models $p^A(x_t|E_t)$ and $p^B(E_t|E_{t-1})$ has a structure collectively referred to as generalized state space model and has a causal structure similar to that of the left-to-right hidden Markov model (HMM) often used for audio recognition (the emotional states $E_{t-1}$ and $E_t$ represented by reference symbol $S_{t1}$ and the audio features $x_{t-1}$ and $x_t$ represented by reference symbol $S_{t2}$ shown in FIG. 5, for example).

In the generalized state space model, if a sequence $\{x_t\}$ of audio feature vectors up to a time t is given, the probability $p(E_t|\{x_t\})$ of the emotional state sequence $E_t$ at the time t can be determined by recursive calculation according to the following formulas based on $p^A(x_t|E_t)$ and $p^B(E_t|E_{t-1})$ (see the Non-patent literature 5, for example).

$$p(E_t | \{x_{t-1}\}) = \sum_{E_{t-1} \in SE} p^B(E_t | E_{t-1}) p(E_{t-1} | \{x_{t-1}\}) \quad (5)$$

$$p(E_t | \{x_t\}) = \frac{p^A(x_t | E_t) p(E_t | \{x_{t-1}\})}{\sum_{E_t \in SE} p^A(x_t | E_t) p(E_t | \{x_{t-1}\})} \quad (6)$$

In these formulas, reference symbol SE represents a set of all possible values of $E_t$.

In general, in the generalized state space model, the value of SE is extremely large, so that it is difficult to determine the value of $p(E_t|\{x_t\})$ by direct calculation of the formulas (5) and (6).

In this embodiment, the possible values of $E_t$ are limited to emotional states to be dealt with including "delight", "sorrow", "fear", "intense", "cool", "pretty", "exciting", "passionate", "romantic", "violent", "gentle", "soothing", "warm", "cold" and "weird" and expressions of emotions including "laugh", "crying", "scream" and "whispering". Provided that the number of the emotional states is |E|, the size of SE is $|E|^n$, considering all the possible combinations of $E_t=\{e_t, e_{t-1}, \ldots, e_{t-n+1}\}$.

For example, according to this embodiment, the number |E| of the emotional states to be dealt with supposed in the example described above is about several dozen. In this case, for example, if n=3, the size of SE is of the order of $10^3$, and even a currently available general-purpose computer can directly calculates the formulas (5) and (6).

Therefore, in this embodiment, the value of the probability $p(E_t|\{x_t\})$ is directly calculated as the emotional state probability according to the formulas (5) and (6) using a computer. When the calculation is difficult to achieve, the approximation method described in the Non-patent literature 5 can be used, for example.

Furthermore, provided that the emotional state sequence $E_t$ excluding the element $e_t$ is represented as $E'_t=\{e_{t-1}, \ldots, e_{t-n+1}\}$, and the set of all possible values of $E'_t$ is represented as SE', from $p(E_t|\{x_t\})$ determined according to the formula (6), the emotional state probability of the emotional state $e_t$ for each frame can be determined by calculation of the following formula.

$$p(e_t | \{x_t\}) = \sum_{E'_t \in SE'} p(e_t, E'_t | \{x_t\}) \quad (7)$$

Figure 6:
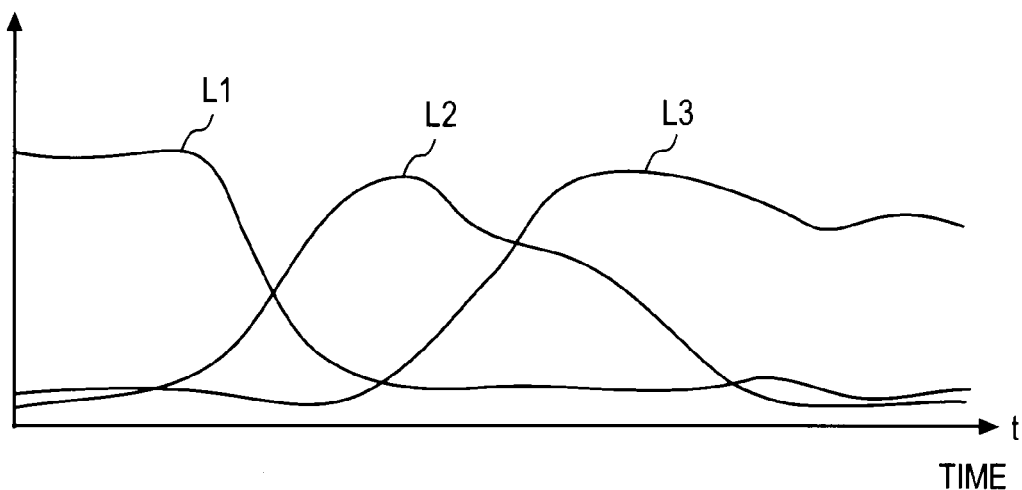

FIG. 6 shows an example of the emotional state probability in a case where emotional states of delight, sorrow and calm are dealt with. More specifically, in FIG. 6, the curve denoted by reference symbol L1 indicates the emotional state probability of delight, the curve denoted by reference symbol L2 indicates the emotional state probability of calm, and the curve denoted by reference symbol L3 indicates the emotional state probability of sorrow.

According to the method described above, the probability of the emotional state $E_t$ is determined by calculation based on the audio feature vector sequence $\{x_t\}$ up to the time t, and therefore, the processing can be performed in real time. On the other hand, if the real time processing is not required, in order to achieve more robust detection, the probability $p(E_t|\{x_T\})$ of the emotional state sequence $E_t$ in the case where the audio feature vector sequence $\{x_T\}$ up to the time T (>t) may be obtained is calculated, and the calculated probability may be regarded as the emotional state probability. The probability $p(E_t|\{x_T\})$ can be determined by using the following formula in addition to the formulas (5) and (6) (see the Non-patent literature 5, for example).

$$p(E_t | \{x_T\}) = p(E_t | \{x_t\}) \sum_{E_{t+1} \in SE'} \frac{p(E_{t+1} | \{x_t\}) p^B(E_{t+1} | E_t)}{p(E_{t+1} | \{x_t\})} \quad (8)$$

In this formula, reference symbol SE denotes a set of all possible values of $E_{t+1}$. The emotional state probability of the emotional state $e_t$ for each frame in this case can be determined by calculation of the following formula.

$$p(e_t | \{x_T\}) = \sum_{E'_t \in SE'} p(e_t, E'_t | \{x_T\}) \quad (9)$$

The processing described above is performed for all the frames, so that the emotional state probability can be calculated for all the frames.

The processing performed in step S150 has been described in detail.

In step S160, the emotional state probability calculated in step S150 is input to emotion determining means, and the emotional state is determined based on the emotional state probability.

In the following, an exemplary processing of determining the emotional state in step S160 will be described. In the following description, categories of the emotional states dealt with have sequential indices $e^1, e^2, \ldots, e^K$. For example, in a case where emotional states of delight, anger, sorrow, fear, surprise, impatience and calm are dealt with, delight can be denoted by $e^1$, anger can be denoted by $e^2$, sorrow can be denoted by $e^3$, fear can be denoted by $e^4$, surprise can be denoted by $e^5$, impatience can be denoted by $e^6$, and calm can be denoted by $e^7$. In this case, K=7.

Since the emotional state probability $p^k_t = p(e_t = e^k | \{x_t\})$ that the emotional state of the frame $F_t$ of the frame identification number t is $e^k$ is calculated for k=1, ..., K in step S150, the emotional state $e^k$ for which the probability $p^k_t$ is maximized can be most simply determined as the emotional state of the frame $F_t$. Alternatively, one or more emotional states $e^k$ may be selected in descending order of $p^k_t$, and the emotional states may be regarded as the determination result.

Some emotional states are likely to occur at the same time, although other emotional states are unlikely to occur at the same time. For example, it can be readily understood that delight and sorrow are unlikely to occur at the same time. Taking such phenomena into account, a convex combination of the emotional state probability $\{p^1_t, p^2_t, p^{k-1}_t, p^{k+1}_t, \ldots, p^K_t\}$ of the other emotional states $\{e^1, e^2, \ldots, e^{k-1}, e^{k+1}, \ldots, e^K\}$ expressed by the following formula may be subtracted from the emotional state probability $p^k_t$ of the emotional state $e^k$, and the difference may be normalized, the normalized difference may be regarded as a new probability $p^k_t$, and the new probability $p^k_t$ may be compared among the emotional states.

$$\lambda^1 p^1_t + \lambda^2 p^2_t + \ldots + \lambda^{k-1} p^{k-1}_t + \lambda^{k+1} p^{k+1}_t + \ldots + \lambda^K p^K_t \quad (10)$$

$$\lambda^l \geq 0, \sum_{l=1,2,\ldots,k-1,k+1,\ldots,K} \lambda^l = 1$$

Alternatively, simply, a threshold may be previously determined, and an emotional state $e^k$ having a probability $p^k_t$ larger than the threshold may be determined as the emotional state of the frame $F_t$.

The processing described above is performed for all the frames, so that the emotional state can be determined for each frame.

The processing performed in step S160 has been described above.

By steps S110 to S160 described above, the emotional state can be determined for each frame of any content including audio signal data.

Then, in step S170, a summarized content is generated based on the emotional state probability calculated in step S150 and the emotional state determined in step S160 and outputted.

In the following, an exemplary processing of generating a summarized content will be described.

According to the principle of the present invention, since the emotional state probability and the emotional state are determined for each frame, a summary can be generated for each frame as a minimum unit. However, it is preferred that the viewer/listener can comprehend the meaning of the summarized content. Therefore, in this embodiment, one or more successive frames are previously grouped into a section. In the following description, the section will be referred to as audio sub-paragraph.

Here, an exemplary method of generating an audio sub-paragraph will be described.

First, a section that can be considered as a speech section is extracted from the content audio signal data. According to an exemplary method of extracting such a section, based on the periodicity of speech sections in an audio waveform, a section for which the autocorrelation function of the audio signal data is high is regarded as a speech section and extracted.

More specifically, for example, the value of the autocorrelation function is compared with a predetermined threshold for each frame, and if the value is greater than the threshold, the frame is determined as a speech frame, or otherwise, the frame is determined as a non-speech frame. A section of successive speech frames for which the value of the autocorrelation function is greater than the threshold is determined as a speech section, and a section that does not meet the condition is determined as a non-speech section. The threshold may be a constant previously determined, such as 0.7, or may be determined after calculation of the value of the autocorrelation function of the entire content to be summarized in such a manner that the ratio of the speech period is close to the ratio of the speech period (sound period) to the non-speech period (silent period) in a general case.

In this embodiment, as an alternative method of extracting a speech section, a series of frames for which the fundamental frequency included in the audio feature vector falls within a predetermined frequency range (from 50 to 350 Hz, for example) may be determined as a speech section.

By the processing described above, the speech sections and the non-speech section in the content can be separated from each other in units of a frame.

Then, a set of successive speech sections that can be considered as a continuous speech in the extracted speech sections is grouped into one audio sub-paragraph. Next, an exemplary method of generating such an audio sub-paragraph will be described.

Speech sections F' in the content are denoted by $F'_1, F'_2, \ldots, F'_N$ in order of time, and the set of the speech sections F' is represented as $\{F'_1, F'_2, \ldots, F'_N\}$. Here, reference symbol N denotes the total number of speech sections.

Then, the time interval between speech sections $F'_i$ and $F'_{i+1}$ adjacent on the time axis, or more specifically, the time difference $t_{i+1start} - t_{iend}$ between the end time $t_{iend}$ of the speech section $F'_i$ and the start time $t_{i+1start}$ of the next speech section $F'_{i+1}$ is calculated.

Then, the calculation result is compared with a previously determined threshold. If the calculation result is smaller than the threshold, the speech sections $F'_i$ and $F'_{i+1}$ are considered as successive speech sections and regarded as belonging to the same audio sub-paragraph. Then, successive speech sections considered as a continuous speech can be grouped into an audio sub-paragraph by repeating the processing for all the speech sections.

The following is a possible alternative method of generating an audio sub-paragraph.

First, the start time and the end time of each speech section of the entire content to be summarized are determined, and the combination thereof is represented as a two-dimensional vector.

Then, bottom-up clustering is performed on the vector in such a manner that the ratio of the speech period to the non-speech period of the entire content to be summarized is approximately the same as the ratio of the speech period to the non-speech period in a general case, thereby generating audio sub-paragraphs. For example, in a case where the ratio of the speech period to the non-speech period in a general case is 6:4, audio sub-paragraphs can be constructed as described below.

First, a vector representing the start time $t_{istart}$ and the end time $t_{iend}$ of a speech section $F'_i$ is denoted by $t_i$. The total speech period in the content can be defined as the total sum of $t_{istart} - t_{iend}$, and the total non-speech period can be defined as the result of subtraction of the total speech period from the entire length of the content. For each vector $t_i$, the norm with respect to the vector $t_{i+1}$, or $t_{i-1}$ is calculated. If the norm is a second-order norm $|t_i - t_{i-1}|^2$, the norm is calculated according to $(t_{istart} - t_{i-1start})^2 + (t_{iend} - t_{i-1end})^2$. A threshold is set for the norm, speech sections for which the norm is equal to or lower than the threshold are coupled to each other to define a new speech section $F'_i$, and the start time $t_{istart}$ and the end time $t_{iend}$ of the new speech section $F'_i$ are calculated. In this way, speech sections temporally close to each other are sequentially grouped into a series of speech sections, that is, an audio sub-paragraph, and the speech period increases. Then, by raising the threshold for the norm stepwise, the same processing is repeated until the ratio of the speech period to the non-speech period is closest to 6:4.

Unlike the method in which the threshold is previously determined, this method can accommodate the difference in speech rate between contents and adaptively construct audio sub-paragraphs.

There is a further alternative method of constructing audio sub-paragraphs based on the periodicity of the speech, not based on the continuous speech period and the continuous non-speech period. As in the example described above, the periodicity may be determined by using the value of the autocorrelation function or may be determined based on the spectrum.

In a case where the value of the autocorrelation function is used, a classification criterion can be set, and audio sub-paragraphs can be constructed based on the classification criterion. For example, classification criteria can be set in such a manner that the periodicity is low if the value of the autocorrelation function is equal to or lower than 0.3, the periodicity is relatively high if the value is higher than 0.3 and equal to or lower than 0.7, and the periodicity is high if the value is higher than 0.7, and audio sub-paragraphs can be constructed based on the classification criteria. For example, in a case where a transition of the value of the autocorrelation function from one of the three regions to another occurs between adjacent sections, the boundary between the adjacent sections is determined as a boundary between audio sub-paragraphs. Alternatively, audio sub-paragraphs may be constructed by regarding the boundary between adjacent sections at which the value of the autocorrelation function changes beyond a certain constant value as a boundary between audio sub-paragraphs, instead of setting an explicit classification criterion.

In a case where the spectrum is used, as in the case where the value of the autocorrelation function is used, audio sub-paragraphs are constructed by setting a classification criterion or setting a criterion of magnitude of change. In a case where a classification criterion is set, various classification criteria are set, such as whether the average power of the spectrum from 0 to 500 Hz is equal to or higher than, or equal to or lower than, a certain value and whether the average power of the spectrum from 500 Hz to 1 kHz is equal to or higher than, or equal to or lower than, a certain value, and if a section meets a classification criterion different from the classification criterion that the immediately preceding section meets, the boundary between the two sections is determined as a boundary between audio sub-paragraphs. Alternatively, audio sub-paragraphs may be constructed by previously determining the band to be noted (for example a band from 0 to 500 Hz) and regarding the boundary between adjacent sections as a boundary between audio sub-paragraphs if the average power of the spectrum of the band differs between the adjacent sections by a certain value or more (for example, the average power difference or the average power ratio is equal to or higher than a predetermined value).

By the processing described above, audio sub-paragraphs can be extracted from the content in units of a frame.

By the processing described above, the entire frames can be grouped into several audio sub-paragraphs.

Then, the emotional level of the emotional state for each constructed audio sub-paragraph is calculated. In the following, an exemplary method of calculating the emotional level will be described with reference to FIG. 7.

Figure 7:
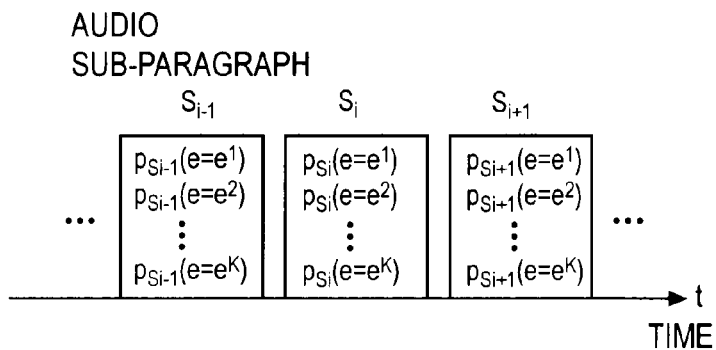
FIG. 7 is a conceptual diagram showing a relationship between audio sub-paragraphs and emotional levels.

Audio sub-paragraphs S in the content are denoted by $S_1$, $S_2, \ldots, S_{NS}$ in order of time, and the set of the audio sub-paragraphs S is represented as $\{S_1, S_2, \ldots, S_{NS}\}$. As an example, FIG. 7 shows audio sub-paragraphs $S_{i-1}$, $S_i$ and $S_{i+1}$. Reference symbol NS denotes the total number of audio sub-paragraphs. Furthermore, a series of frames included in the audio sub-paragraph $S_i$ is represented as $\{f_1, f_2, \ldots, f_{NFi}\}$. Reference symbol Nfi denotes the number of frames included in the audio sub-paragraph $S_i$.

The emotional state probability $p(e_t | \{x_t\})$ of each frame $f_t$ is calculated by emotional state probability calculating means according to the formula (7) or (9). The emotional level $p_{Si}$ ($e = e^k$) of the audio sub-paragraph $S_i$ in the case where the emotional state e is $e^k$ can be calculated according to the following formula that represents the average value, for example.

$$p_{Si}(e = e^k) = \frac{1}{NFi} \sum_{t=1}^{NFi} p(e_t = e^k | \{x_t\}) \tag{11}$$

Alternatively, the emotional level can be calculated according to the following formula that represents the maximum value, for example.

$$p_{Si}(e = e^k) = \max_{t=1,2,\ldots,NFi} p(e_t = e^k | \{x_t\}) \tag{12}$$

Furthermore, there are various possible methods of calculating the emotional level, such as one that calculates the emotional level after windowing in the audio sub-paragraph. However, since the emotional level is sometimes compared between audio sub-paragraphs, the emotional level preferably falls within a certain range, for example, a range of 0 to 1.

FIG. 7 shows emotional levels $p_{Si}(e=e^1)$, $p_{Si}(e=e^2), \ldots, p_{Si}$ ($e=e^K$) determined for the emotional states $e^1, e^2, \ldots, e^K$ for a series of frames in each audio sub-paragraph $S_i$.

The emotional level of all the emotional states for all the audio sub-paragraphs can be calculated by performing the processing described above for all the audio sub-paragraphs.

Next, summarized content generation in step S170 in FIG. 1 will be described.

A summarized content is generated by sequentially extracting, from the content, audio paragraphs having a time length within a target time length composed of a series of audio sub-paragraphs including an audio sub-paragraph having a high emotional level. The target time of the audio paragraph is set at about 5 seconds or 10 seconds, and the audio sub-paragraphs are grouped in such a manner that the time length of the audio paragraph approaches to the target time.

A method of performing the processing will be described with reference to FIG. 8. Of all the audio sub-paragraphs extracted from the content, an audio sub-paragraph having the highest emotional level (which may be of any emotional state) within the range of the target time length from the last one or within the range of the target time length from the first one is denoted by $S_i$. Then, beginning with the audio sub-paragraph $S_i$, audio sub-paragraphs are grouped in the backward direction of time (i−1, i−2, . . . ) or in the forward direction of time (i+1, i+2, . . . ) until the total time length of the audio sub-paragraphs reaches the target time length. Alternatively, the grouping may be performed in both the directions. Once one audio paragraph is determined in this way, another audio paragraph is determined by the same processing using the audio sub-paragraph having the highest emotional level within the next range of the target time length as a base point. A series of audio paragraphs can be generated by performing such a processing for the entire content.

Figure 8:
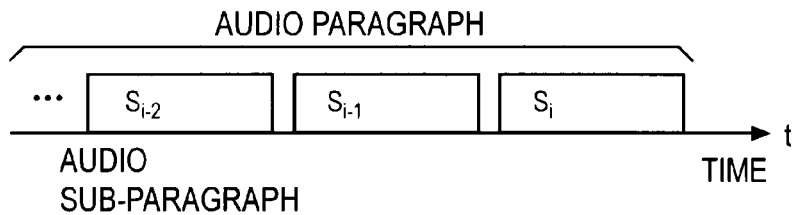
FIG. 8 is a diagram for illustrating an exemplary method of generating an audio paragraph.

For example, in the case where the grouping is performed in the backward direction of time, as shown in FIG. 8, the audio sub-paragraph $S_i$ having an intense emotional state is located at the end of an audio paragraph VC in the summarized content. Thus, when the audio paragraph VC is viewed or listened to, the event that causes the intense emotional state is likely to be included in the audio sub-paragraphs $S_{i-1}$, $S_{i-2}$ and so on preceding the last audio sub-paragraph $S_i$. Therefore, the summarized content can advantageously reflect the cause and effect of the emotional state.

On the other hand, in the case where the grouping is performed in the forward direction of time, the audio sub-paragraph $S_i$ having an intense emotional state is located at the beginning of an audio paragraph in the summarized content. Thus, when the audio paragraph is viewed or listened to, the section exhibiting an impressive emotional state is first viewed or listened to, so that the summarized content is advantageously more impressive.

Alternatively, when the length of time between adjacent audio sub-paragraphs is equal to or less than a certain threshold, the sub-paragraphs may be grouped to form an audio paragraph.

Figure 9:
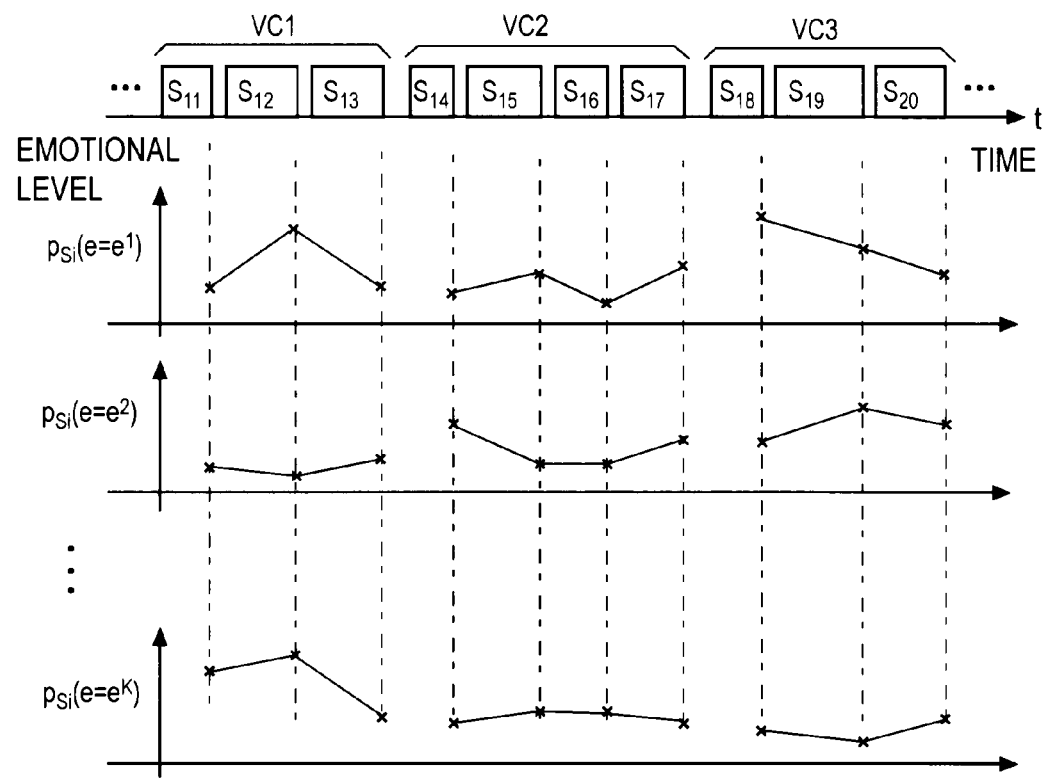
FIG. 9 is a conceptual diagram showing a relationship between audio paragraphs and emotional levels.

FIG. 9 shows an example in which a series of audio paragraphs VC1, VC2 and VC3 determined as described above, and the audio paragraph VC1 is composed of three audio sub-paragraphs $S_{11}$, $S_{12}$ and $S_{13}$, the audio paragraph VC2 is composed of four audio sub-paragraphs $S_{14}$, $S_{15}$, $S_{16}$ and $S_{17}$, and the audio paragraph VC3 is composed of three audio sub-paragraphs $S_{18}$, $S_{19}$ and $S_{20}$.

Since the emotional level is given for each audio sub-paragraph, the number of emotional levels involved with each audio paragraph is the number of audio sub-paragraphs multiplied by the number of emotional states. In FIG. 9, emotional levels $p_{Si}(e=e^1)$, $p_{Si}(e=e^2)$, . . . , $p_{Si}(e=e^K)$ determined for each audio sub-paragraph $S_i$ in each audio paragraph are indicated by a cross, and the crosses indicating the emotional level of the same kind of emotional state $e^k$ are connected by a straight line.

In practice, based on the emotional level of each emotional state $e^k$, the cumulative emotional level for each audio paragraph is calculated. For example, the cumulative emotional level for each audio paragraph is determined by determining the average, weighted average or maximum value of the emotional levels of the emotional states for each audio sub-paragraph and calculating a cumulative sum of the averages, the weighted averages or the maximum values for the audio sub-paragraphs in the audio paragraph. Alternatively, the cumulative sum may be divided by the number of audio sub-paragraphs in the audio paragraph to determine an average value, and the average value may be regarded as the cumulative emotional level.

The summarized content may be created by ranking the audio paragraphs in descending order of the cumulative emotional level (the same number of cumulative emotional levels as the number K of emotional states are determined for each audio paragraph) and extracting the top several audio paragraphs so that the compression ratio with respect to the original content is close to a certain target value.

The target value may be arbitrarily input by the viewer/listener. Furthermore, the viewer/listener may input a desired reference value for the cumulative emotional level of a desired emotional state to create a summary by preferentially extracting an audio paragraph that meets the reference value.

Figure 10:
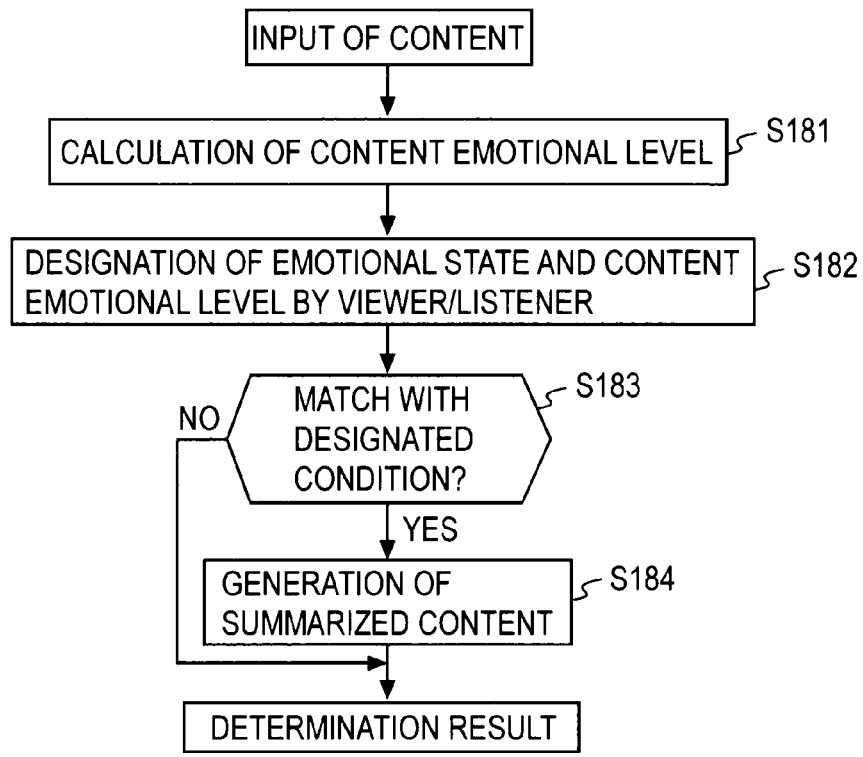
FIG. 10 is a flowchart showing a process of determining an emotional state of a content and generating a summarized content.

Next, an exemplary method of determining whether the content contains a section in a desired emotional state for the viewer/listener will be described with reference to FIG. 10.

First, in step S181, for example, for the cumulative emotional level of each emotional state $e^k$ (k=1, . . . , K) determined for each audio paragraph, the average, weighted average or maximum value for the entire content is determined, and the emotional level of each emotional state $e^k$ for the entire content (referred to as content emotional level, represented by $PC^k$, hereinafter) is separately calculated based on the result of the calculation. The K content emotional levels $PC^k$ (k=1, . . . , K) provide an indication of what kind of emotional state is contained in the content to what degree.

Then, in step S182, the viewer/listener input a desired emotional state $e^k$ and a desired content emotional level $RPC^k$ of the emotional state as conditions.

Then, in step S183, it is determined whether or not the content contains the desired emotional state $e^k$ for the viewer/listener by comparison between the content emotional level $PC^k$ determined for the content and the input condition $RPC^k$.

According to a determination method, for example, it is determined that the content meets the conditions if the absolute value $|RPC^k - PC^k|$ of the difference between the content emotional level $RPC^k$ of the emotional state $e^k$ designated as a condition and the corresponding content emotional level $PC^k$ of the emotional state $e^k$ determined for the content is smaller than a previously determined threshold. Alternatively, it may be determined that the content meets the conditions if $PC^k > RPC^k$.

If the content is a desired content for the viewer/listener, then, in step S184, a summarized content is created and presented together with the determination result.

By the processing described above, it can be determined whether the content contains a section in the desired emotional state for the viewer/listener.

The processing of generating a summarized content in step S170 has been described in detail.

The emotion detecting method according to this embodiment has been described in detail.

Of course, a part or the whole of the function of each means used in the emotion detecting method according to this embodiment may be constituted by a computer program, and the program may be executed by a computer to implement the present invention, or the procedure of the emotion detecting method according to this embodiment may be implemented as a computer program, and the program may be executed by a computer.

Figure 11:
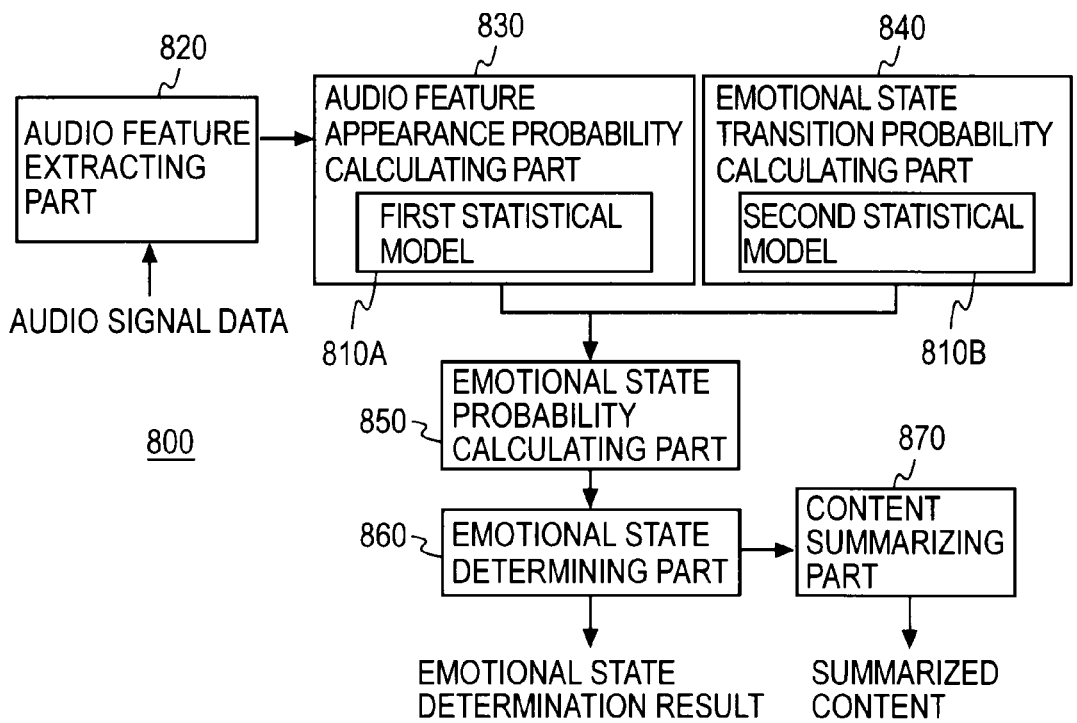
FIG. 11 is a diagram showing a logical configuration of an emotion detecting apparatus according to the embodiment.

FIG. 11 is a block diagram showing a functional configuration of an emotion detecting apparatus according to the present invention. In FIG. 11, an emotion detecting apparatus 800 comprises an audio feature extracting part 820, an audio feature appearance probability calculating part 830, an emotional state transition probability calculating part 840, an emotional state probability calculating part 850, an emotional state determining part 860 and a content summarizing part 870.

Furthermore, the audio feature appearance probability calculating part 830 has a first statistical model 810A, and the emotional state transition probability calculating part 840 has a second statistical model 810B.

The first and second statistical models 810A and 810B are models of an audio feature appearance probability distribution $p^A(x_t|E_t)$ and an emotional state transition probability distribution $p^B(E_t|E_{t-1})$, respectively, that are constructed by learning according to a conventional method based on an audio feature contained in learning audio signal data and an emotional state estimated from the audio.

The audio feature extracting part 820 extracts an audio feature vector from input content audio signal data for each frame.

The audio feature appearance probability calculating part 830 calculates the probability $p(x_t|E_t)$ of appearance of the extracted audio feature vector in an emotional state based on the first statistical model 810A.

The emotional state transition probability calculating part 840 calculates the probability $p(E_t|E_{t-1})$ of temporal transition of the emotional state based on the second statistical model 810B.

The emotional state probability calculating part 850 calculates the emotional state probability $p(E_t|\{x_t\})$ according to the formulas (5) and (6) based on the appearance probability $p(x_t|E_t)$ calculated by the audio feature appearance probability calculating part 830 and the transition probability $p(E_t|E_{t-1})$ calculated by the emotional state transition probability calculating part 840.

The emotional state determining part 860 determines the emotional state $e^k$ (k=1, ..., K) for each frame of the input audio signal data based on the emotional state probability $p(E_t|\{x_t\})$ calculated by the emotional state probability calculating part 850.

The content summarizing part 870 is optionally provided in the emotion detecting apparatus 800 and detects a section in an emotional state based on one or more of the emotional state, the emotional state probability, the continuous speech period and continuous non-speech period determined and creates a summary of the content based on the result of the detection.

A specific example of a hardware configuration of a computer that implements the functional configuration of the emotion detecting apparatus 800 shown in FIG. 11 will be described with reference to FIG. 12.

Figure 12:
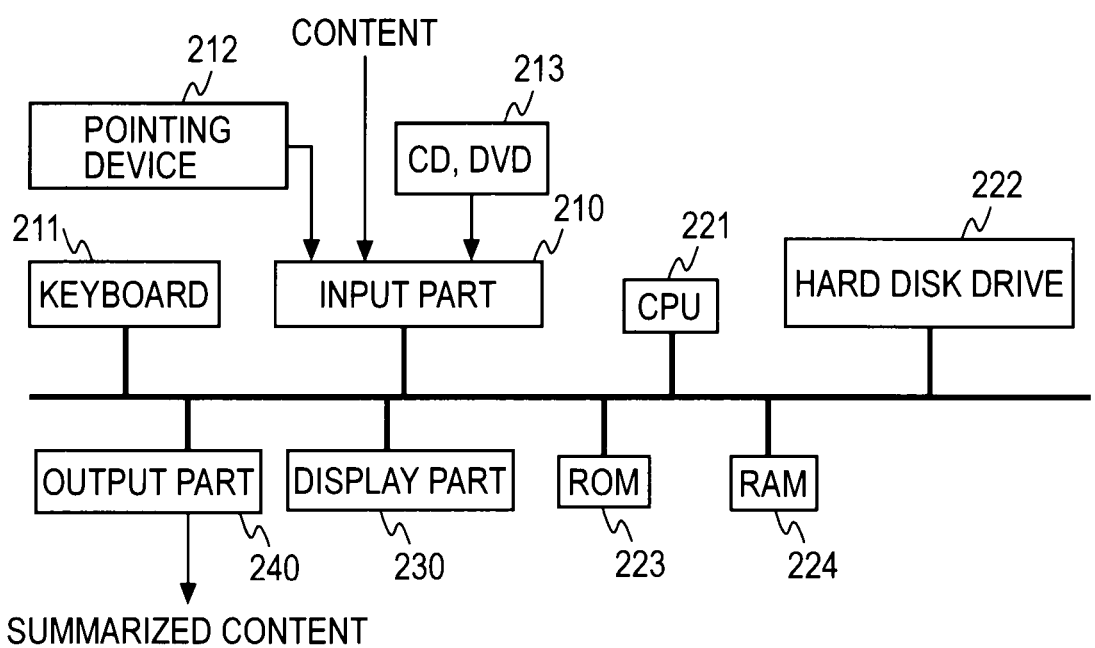
FIG. 12 is a diagram showing a physical configuration of the emotion detecting apparatus according to the embodiment.

A content containing audio signal data that is externally input to an input part 210 shown in FIG. 12 in the form of a digital signal is temporarily stored in a hard disk drive 222 under the control of a central processing unit (CPU) 221, which is a controlling part.

For example, a pointing device 212, such as a mouse, and a keyboard 211 are connected to the input part 210.

The content may be a content received via a communication network or a content read from a compact disk (CD), a digital versatile disk (DVD) or the like using an optical disk drive 213.

A display part 230 has a monitor screen, such as a liquid crystal screen, and is capable of displaying information output from the CPU 221 in response to operation of the keyboard 211 or the pointing device 212. On the monitor screen of the display part 230, the input data, the processing status, the processing result, the summary, the content and other information are displayed as required. In addition, sound can be reproduced.

The CPU 221 shown in FIG. 12 can execute a program that describes the processing functions of the audio feature extracting part 820, the audio feature appearance probability calculating part 830, the emotional state transition probability calculating part 840, the emotional state probability calculating part 850, the emotional state determining part 860 and the content summarizing part 870 of the emotion detecting apparatus 800 shown in FIG. 11 and implement the functions. The program is stored in the hard disk drive 222, for example, and a required program and data is loaded into a random access memory (RAM) 224 for execution. The loaded program is executed by the CPU 221.

The hard disk drive 222 further stores the first statistical model 810A and the second statistical model 810B and an input content. A read only memory (ROM) 223 stores a basic program for activating the computer, other programs, control parameters and the like.

An output part 240 has an additional function of extracting a part in an emotional state of the audio signal data of the input content and outputting a summarized content generated based on the extracted part under the control of a program executed by the CPU 221. Furthermore, the output part 240 may have a function of recording the generated summarized content in a CD, a DVD or the like. The output part 240 may have a communication function that enables external data transmission. The output part 240 may extract video signal data in the section corresponding to the audio signal data and output the video together with the audio as a summarized content as required.

As described above, according to this embodiment, since the audio features include the sequence of the temporal variation characteristic of the fundamental frequency, even in the absence of the fundamental frequency, the absence can be compensated for to achieve more stable determination. This is a solution to the problem of the prior art that the fundamental frequency often fails to be extracted from a speech in an emotional state. In addition, since only the codes representing the function type of the first and second statistical models and the codes representing the parameters thereof have to be stored, so that the size of the memory used and the calculation time and cost can be reduced.

In the following, examples in which a desired emotional state is determined and a summarized content is generated according to this embodiment will be described.

First Example

A first example is an example in which two types of emotional states are dealt with, or more specifically, determination of whether the state is an "emotional state" or a "non-emotional state" is made. The first example will be described below.

In the first example, a section in the learning audio signal data that is determined to be in the "emotional state" is labeled with "emotional state", and a section in the remaining sections that is determined to be in the "non-emotional state" is labeled with "non-emotional state".

All the frames included in the labeled sections in the learning audio signal data are extracted, and the frames are labeled the same as the sections from which the frames are extracted. In this way, learning audio signal data labeled in units of a frame is obtained.

Based on the learning audio signal data, the first statistical model $p^A(x_t|E_t)$ used for calculation of the audio feature appearance probability (the first statistical model 810A shown in FIG. 11 is a specific example thereof) and the second statistical model $p^B(E_t|E_{t-1})$ used for calculation of the emotional state transition probability (the second statistical model 810B shown in FIG. 11 is a specific example thereof) are constructed and stored.

The following is a procedure of emotional state determination in the first example.

First, audio signal data is obtained from the input content and divided into frames (step 1). Then, for each frame, an audio feature vector is extracted (step 2). Then, using the previously constructed first statistical model, the probability of the "emotional state" and the probability of the "non-emotional state" are calculated for each frame, and the frames for which the probability of the "emotional state" is higher than the probability of the "non-emotional state" are determined as "emotional" frames (step 3).

Second Example

A second example is an example in which, based on the probability of the "emotional state" and the probability of the "non-emotional state" for each frame calculated in the first example, an audio paragraph is generated, and a summary of the content is generated.

In the second example, the same procedure as that including steps 1 to 3 in the first example is performed. After step 3, a speech frame is extracted based on the value of the autocorrelation function, and then, an audio paragraph is generated by applying the bottom-up clustering method to all the frames so that the ratio of the audio paragraph section to the other section approaches a certain target value (step 4).

Then, for each audio paragraph generated in step 4, the cumulative emotional level of the "emotional state" and the cumulative emotional level of the "non-emotional state" are calculated (step 5). Then, a summarized content is created and presented according to any of the presentation methods described below (step 6).

According to a first presentation method, the viewer/listener inputs the length of time of the summary, and audio paragraphs for a length of time closest to the input length of time of the summary are extracted in descending order of the cumulative emotional level of the "emotional state" and combined to form a summarized content, and the summarized content is presented.

According to a second presentation method, audio paragraphs for a length of time closest to a previously determined length of time of the summary are extracted in descending order of the cumulative emotional level of the "emotional state" and combined to form a summarized content, and the summarized content is presented.

According to a third presentation method, the viewer/listener inputs a threshold, or a threshold is previously determined, audio paragraphs for which the cumulative emotional level of the "emotional state" is higher than the threshold are extracted and combined to form a summarized content, and the summarized content is presented.

Third Example

A third example is an example in which several specific emotional states (various emotional states including delight, anger, sorrow, fear, surprise, impatience and calm) are dealt with, and determination thereof is made.

As in the first example, sections in the learning audio signal data that are determined to be in an emotional state are given the corresponding labels.

All the frames included in the labeled sections in the learning audio signal data are extracted, and the frames are labeled the same as the sections from which the frames are extracted. In this way, learning audio signal data labeled in units of a frame is obtained. Based on the learning audio signal data, the first statistical model used for calculation of the audio feature appearance probability and the second statistical model used for calculation of the emotional state transition probability are constructed and stored.

The following is a procedure of emotional state determination in the third example.

First, audio signal data is obtained from the input content and divided into frames (step 1). Then, for each frame, an audio feature vector is extracted (step 2). Then, using the previously constructed first and second statistical models, the probability of each emotional state is calculated for each frame, and the emotional state having the highest emotional state probability is determined as the emotional state of the frame (step 3).

Fourth Example

A fourth example is an example in which, based on the probability of each emotional state for each frame calculated in the third example, an audio paragraph is generated, and a summary of the content is generated.

The procedure from step 1 to step 3 in the fourth example is the same as that in the third example. The following is a procedure that follows step 3.

After step 3, a speech frame is extracted based on the value of the autocorrelation function, and then, an audio paragraph is generated by applying the bottom-up clustering method to all the frames so that the ratio of the audio paragraph section to the other section approaches a certain target value (step 4). Then, for each audio paragraph generated in step 4, the cumulative emotional level of each emotional state is calculated (step 5). Then, a summarized content is created and presented according to any of the presentation methods described below (step 6).

According to a first presentation method, the viewer/listener inputs a desired emotional state and the length of time of the summary, and audio paragraphs for a length of time closest to the input length of time of the summary are extracted in descending order of the cumulative emotional level of the input emotional state and combined to form a summarized content, and the summarized content is presented.

According to a second presentation method, the viewer/listener inputs a desired emotional state, audio paragraphs for a length of time closest to a previously determined length of time of the summary are extracted in descending order of the cumulative emotional level of the input emotional state and combined to form a summarized content, and the summarized content is presented.

According to a third presentation method, the viewer/listener inputs an emotional state, audio paragraphs for which the cumulative emotional level of the input emotional state is higher than a threshold input by the viewer/listener or previously determined are extracted and combined to form a summarized content, and the summarized content is presented.

Fifth Example

A fifth example is an example in which, using the probability of each emotional state and the determined emotional state for each frame calculated in the third example, it is determined whether or not the content contains an emotional state designated by the viewer/listener.

The procedure from step 1 to step 5 in the fifth example is the same as that in the fourth example. The following is a procedure that follows step 5.

After step 5, content determination is made according to any of the determination methods described below.

According to a first determination method, the viewer/listener inputs a desired emotional state and a threshold of the content emotional level, it is determined that the content contains the input emotional state when the content emotional level of the input emotional state is higher than the input threshold, and the result is output.

According to a second determination method, the viewer/listener inputs a desired emotional state, it is determined that the content contains the input emotional state when the content emotional level of the input emotional state is higher than a previously determined threshold, and the result is output.

Furthermore, in the fifth example, a summary may be created for the determined content and presented in the same manner as in step 6 in the fourth example.

An embodiment of the present invention has been described above. However, the present invention is not limited to the embodiment described above, and various modifications can be made without departing from the scope of the present invention described in the claims.

For example, extensible markup language (XML) data containing the generated summarized content may be created. General-purpose XML can improve the availability of the summarized content.

What is claimed is:

1. An emotion detecting method that performs an emotion detecting processing based on an audio feature of input audio signal data, comprising:
   an audio feature extracting step of extracting, as an audio feature vector, one or more of a fundamental frequency, a sequence of a temporal variation characteristic of the fundamental frequency, a power, a sequence of a temporal variation characteristic of the power, and a temporal variation characteristic of a speech rate from the audio signal data for each analysis frame, and storing the audio feature vector in a storage part;
   an audio feature appearance probability calculating step of reading the audio feature vector for each analysis frame and calculating the audio feature appearance probability that the audio feature vector appears on condition of sequences of predetermined emotional states corresponding to one or more types of emotions using a first statistical model constructed based on previously input learning audio signal data;
   an emotional state transition probability calculating step of calculating the probability of temporal transition of sequences of the predetermined emotional states as the emotional state transition probability using a second statistical model;
   an emotional state probability calculating step of calculating the emotional state probability based on the audio feature appearance probability and the emotional state transition probability; and
   an information outputting step of outputting information about the emotional state for each section including one or more analysis frames based on the calculated emotional state probability.

2. An emotion detecting method that performs an emotion detecting processing based on an audio feature of input audio signal data, comprising:
   an audio feature extracting step of extracting, as an audio feature vector, one or more of a fundamental frequency, a sequence of a temporal variation characteristic of the fundamental frequency, a power, a sequence of a temporal variation characteristic of the power, and a temporal variation characteristic of a speech rate from the audio signal data for each analysis frame, and storing the audio feature vector in a storage part;
   an emotional state probability processing step of reading the audio feature vector for each analysis frame and calculating the emotional state probability on condition of the audio feature vector for sequences of predetermined emotional states corresponding to one or more types of emotions using one or more statistical models constructed based on previously input learning audio signal data;
   an emotional state determining step of determining the emotional state of a section including the analysis frame based on the emotional state probability; and
   a step of outputting information about the determined emotional state.

3. The emotion detecting method according to claim 2, wherein the emotional state probability processing step comprises:
   an audio feature appearance probability calculating step of calculating the audio feature appearance probability that the audio feature vector appears on condition of sequences of the predetermined emotional states using a first statistical model among the one or more statistical models;
   an emotional state transition probability calculating step of calculating the probability of temporal transition of sequences of the predetermined emotional states as the emotional state transition probability using a second statistical model among the one or more statistical models; and
   a step of calculating the emotional state probability based on the audio feature appearance probability and the emotional state transition probability.

4. The emotion detecting method according to claim 1 or 3, wherein the audio feature appearance probability calculating step is a step of calculating the audio feature appearance probability for a section including one or more analysis frames based on the first statistical model, which is constructed as a conditional appearance probability of an audio feature vector in a case where a sequence of an emotional state is given.

5. The emotion detecting method according to claim 1 or 3, wherein the emotional state transition probability calculating step is a step of calculating the emotional state transition probability based on the second statistical model, which is constructed to determine the probability of appearance of a sequence of an emotional state in a section including one or more analysis frames as a conditional transition probability of the sequence of the emotional state in a current analysis frame on condition that a sequence of an emotional state for a section that precedes said section by at least one analysis frame is given.

6. The emotion detecting method according to claim 2 or 3, wherein the emotional state determining step comprises a step of selecting emotional states in descending order of the emotional state probability and determining that the selected emotional states are the emotional states of the section including the analysis frame.

7. The emotion detecting method according to claim 2 or 3, wherein the emotional state determining step comprises a step of calculating the difference between the probability of each of the emotional states and a convex combination of the probabilities of other emotional states, selecting predetermined emotional states corresponding to one or more emotions in descending order of the difference, and determining that the selected emotional states are the emotional states of the section including the analysis frame.

8. The emotion detecting method according to claim 1 or 2, further comprising:
a step of inputting an audio feature vector and learning audio signal data with a label indicating an emotional state for each analysis frame.

9. The emotion detecting method according to claim 1 or 2, further comprising:
a step of determining whether each analysis frame is a speech frame or not, forming a speech section from one or more successive speech frames, forming an audio sub-paragraph from one or more successive speech sections, calculating the emotional level of the emotional state based on the emotional state probability of the analysis frames included in the audio sub-paragraph for each audio sub-paragraph, and extracting a summary of a content from the input audio signal data based on the emotional level.

10. The emotion detecting method according to claim 1 or 2, further comprising:
a step of determining the signal periodicity of the audio signal data in units of an analysis frame, forming a section of one or more successive analysis frames based on the periodicity, calculating the emotional level of the emotional state based on the emotional state probability for each section, and extracting a summary of a content from the input audio signal data based on the emotional level.

11. A non-transitory computer-readable recording medium in which a program capable of making a computer implement an emotion detecting method according to claim 1 or 2 is recorded.

12. An emotion detecting apparatus that performs an emotion detecting processing based on an audio feature of input audio signal data, comprising:
an audio feature extracting means for extracting as, an audio feature vector, one or more of a fundamental frequency, a sequence of a temporal variation characteristic of the fundamental frequency, a power, a sequence of a temporal variation characteristic of the power, and a temporal variation characteristic of a speech rate from the audio signal data for each analysis frame, and storing the audio feature vector in a storage part;
an audio feature appearance probability calculating means for reading the audio feature vector for each analysis frame and calculating the audio feature appearance probability that the audio feature vector appears on condition of sequences of predetermined emotional states corresponding to one or more types of emotions using a first statistical model constructed based on previously input learning audio signal data;
an emotional state transition probability calculating means for calculating the probability of temporal transition of sequences of the predetermined emotional states as the emotional state transition probability using a second statistical model;
an emotional state probability calculating means for calculating the emotional state probability based on the audio feature appearance probability and the emotional state transition probability; and
an information outputting means for outputting information about the emotional state for each section including one or more analysis frames based on the calculated emotional state probability.

13. An emotion detecting apparatus that performs an emotion detecting processing based on an audio feature of input audio signal data, comprising:
an audio feature extracting means for extracting, as an audio feature vector, one or more of a fundamental frequency, a sequence of a temporal variation characteristic of the fundamental frequency, a power, a sequence of a temporal variation characteristic of the power, and a temporal variation characteristic of a speech rate from the audio signal data for each analysis frame, and storing the audio feature vector in a storage part;
an emotional state probability processing means for reading the audio feature vector for each analysis frame and calculating the emotional state probability on condition of the audio feature vector for sequences of predetermined emotional states corresponding to one or more types of emotions using one or more statistical models constructed based on previously input learning audio signal data;
an emotional state determining means for determining the emotional state of a section including the analysis frame based on the emotional state probability; and
an information outputting means for outputting information about the determined emotional state.

14. The emotion detecting apparatus according to claim 13, wherein the emotional state probability processing means comprises:
an audio feature appearance probability calculating means for calculating the audio feature appearance probability that the audio feature vector appears on condition of sequences of the predetermined emotional states using a first statistical model as one of the one or more statistical models;
an emotional state transition probability calculating means for calculating the probability of temporal transition of sequences of the predetermined emotional states as the emotional state transition probability using a second statistical model as another one of the one or more statistical models; and
an emotional state probability calculating means for calculating the emotional state probability based on the audio feature appearance probability and the emotional state transition probability.

15. The emotion detecting apparatus according to claim 12 or 14, wherein the audio feature appearance probability calculating means calculates the audio feature appearance probability for a section including one or more analysis frames based on the first statistical model, which is constructed as a conditional appearance probability of an audio feature vector in a case where a sequence of an emotional state is given.

16. The emotion detecting apparatus according to claim 12 or 14, wherein the emotional state transition probability calculating means calculates the emotional state transition probability based on the second statistical model, which is constructed to determine the probability of appearance of a sequence of an emotional state in a section including one or more analysis frames as a conditional transition probability of the sequence of the emotional state in a current analysis frame on condition that a sequence of an emotional state for a section that precedes said section by at least one analysis frame is given.

17. The emotion detecting apparatus according to claim 13 or 14, wherein the emotional state determining means comprises a selecting means for selecting emotional states in descending order of the emotional state probability and determining that the selected emotional states are the emotional states of the section including the analysis frame.

18. The emotion detecting apparatus according to claim 13 or 14, wherein the emotional state determining means comprises a difference calculating means for calculating the difference between the probability of each of the emotional states and a convex combination of the probabilities of the other emotional states, selecting predetermined emotional states corresponding to one or more types of emotions in descending order of the difference, and determining that the selected emotional states are the emotional states of the section including the analysis frame.

19. The emotion detecting apparatus according to claim 12 or 13, further comprising:
an input means for inputting an audio feature vector and learning audio signal data with a label indicating an emotional state for each analysis frame.

20. The emotion detecting apparatus according to claim 12 or 13, further comprising:
an extracting means for determining whether each analysis frame is a speech frame or not, forming a speech section from one or more successive speech frames, forming an audio sub-paragraph from one or more successive speech sections, calculating the emotional level of the emotional state based on the emotional state probability of the analysis frames included in the audio sub-paragraph for each audio sub-paragraph, and extracting a summary of a content from the input audio signal data based on the emotional level.

21. The emotion detecting apparatus according to claim 12 or 13, further comprising:
an extracting means for determining the signal periodicity of the audio signal data in units of an analysis frame, forming a section of one or more successive analysis frames based on the periodicity, calculating the emotional level of the emotional state based on the emotional state probability for each section, and extracting a summary of a content from the input audio signal data based on the emotional level.

* * * * *